(12) United States Patent
Murray

(10) Patent No.: US 11,877,677 B2
(45) Date of Patent: Jan. 23, 2024

(54) REUSABLE BEVERAGE CONTAINER

(71) Applicant: Andrew Murray, Noosa Heads (AU)

(72) Inventor: Andrew Murray, Noosa Heads (AU)

( * ) Notice: Subject to any disclaimer, the term of this patent is extended or adjusted under 35 U.S.C. 154(b) by 170 days.

(21) Appl. No.: 17/309,011

(22) PCT Filed: Jan. 23, 2020

(86) PCT No.: PCT/AU2020/050037
§ 371 (c)(1),
(2) Date: Apr. 13, 2021

(87) PCT Pub. No.: WO2020/150777
PCT Pub. Date: Jul. 30, 2020

(65) Prior Publication Data
US 2022/0022672 A1    Jan. 27, 2022

(30) Foreign Application Priority Data
Jan. 25, 2019    (AU) .................................. 2019900232

(51) Int. Cl.
*A47G 19/22*    (2006.01)
*A47G 23/02*    (2006.01)
*B65D 43/02*    (2006.01)
*B65D 43/06*    (2006.01)
*B65D 47/32*    (2006.01)

(52) U.S. Cl.
CPC ..... *A47G 19/2255* (2013.01); *A47G 23/0216* (2013.01); *B65D 43/0218* (2013.01); *B65D 43/065* (2013.01); *B65D 47/32* (2013.01); *A47G 19/2288* (2013.01); *B65D 2251/20* (2013.01)

(58) Field of Classification Search
CPC ............ A47G 19/2255; A47G 23/0216; B65D 43/0218; B65D 43/022
USPC .................................................. 220/737, 739
See application file for complete search history.

(56) References Cited

U.S. PATENT DOCUMENTS 2,228,936 A * 1/1941 Walter ............... B65D 51/1683
215/310
4,412,630 A * 11/1983 Daenen .............. B65D 43/0218
220/792

(Continued)

FOREIGN PATENT DOCUMENTS

KR    101254725 B1    4/2013

OTHER PUBLICATIONS

International Preliminary Report on Patentability dated Nov. 18, 2020 from PCT Application No. PCT/AU2020/050037.
(Continued)

*Primary Examiner* — Jeffrey R Allen
(74) *Attorney, Agent, or Firm* — INNOVATION CAPITAL LAW GROUP, LLP; Vic Lin

(57) ABSTRACT

A reusable beverage container has a glass cup having a formed mouth having a smooth exterior frustoconical surface which widens in exterior diameter towards a rim of the mouth. The mouth has a height of greater than 15 mm. A lid engages the mouth. The lid has a top section and an elastomeric skirt, the top section having a drinking aperture therethrough and the skirt defining an inner frustoconical surface and an outer surface. The inner frustoconical surface conforms in shape and size to the outer frustoconical surface and the skirt thickening towards a lower edge thereof.

25 Claims, 6 Drawing Sheets

(56) References Cited

U.S. PATENT DOCUMENTS

| | | | |
|---|---|---|---|
| 7,770,748 B2 * | 8/2010 | Elliott | A47G 19/2205 |
| | | | 215/393 |
| D714,162 S * | 9/2014 | Kang | D9/716 |
| 2014/0061971 A1 * | 3/2014 | Haymond | B29C 43/021 |
| | | | 264/299 |
| 2016/0318677 A1 | 11/2016 | Schneider | |
| 2018/0279815 A1 * | 10/2018 | Hakim | B65D 25/2802 |

OTHER PUBLICATIONS

International Search Report and Written Opinion dated Mar. 16, 2020 from PCT Application No. PCT/AU2020/050037.

* cited by examiner

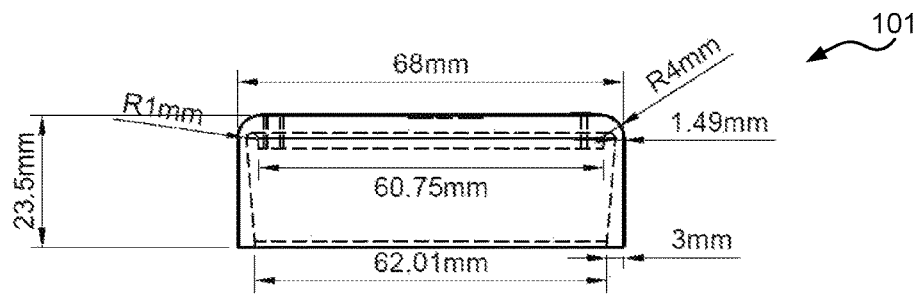
Figure 10
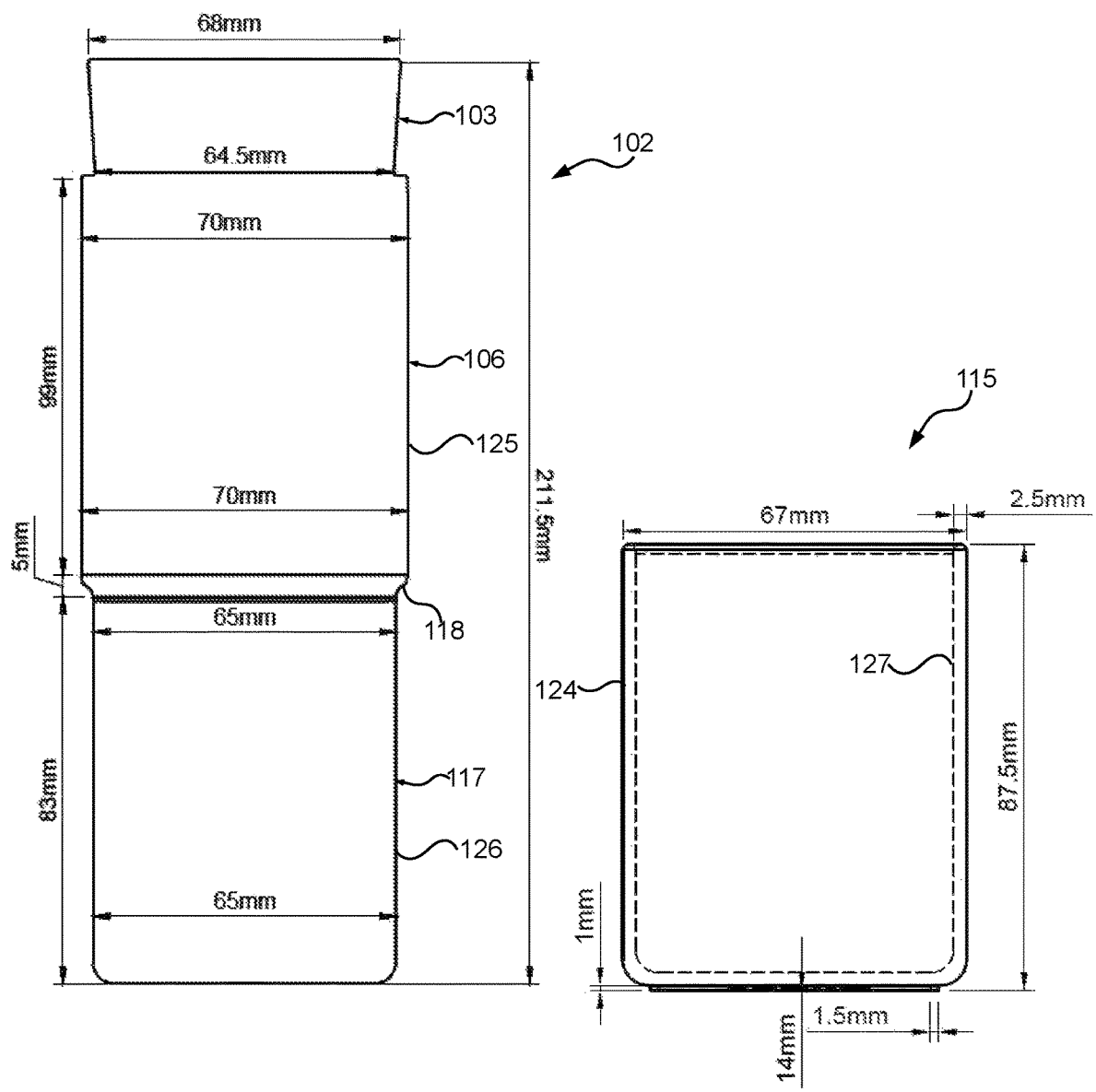
Figure 11
Figure 12

REUSABLE BEVERAGE CONTAINER

FIELD OF THE INVENTION

This invention relates generally to a reusable beverage container and more particularly, this invention relates to a reusable beverage container comprising a glass cup having a formed frustoconical mouth sealed by an elastomeric skirt of a lid.

BACKGROUND OF THE INVENTION

Reusable beverage containers such as coffee "keep cups" comprise cups having various configuration of twist-on or snap-on lids.

The present invention seeks to provide an improved reusable beverage container, which will overcome or substantially ameliorate at least some of the deficiencies of the prior art, or to at least provide an alternative.

It is to be understood that, if any prior art information is referred to herein, such reference does not constitute an admission that the information forms part of the common general knowledge in the art, in Australia or any other country.

SUMMARY OF THE DISCLOSURE

There is provided herein a reusable beverage container comprising a glass cup having a formed mouth and a lid for engagement thereof. The formed mouth has a smooth exterior frustoconical surface which widens in exterior diameter towards a rim of the mouth. The mouth has a height of greater than 15 mm (such as of approximately 20 mm and 30 mm variants in embodiments).

The lid comprises a top section and an elastomeric (rubber-like) skirt (such as heat stable elastic silicon). The top section has a drinking aperture therethrough and, in embodiments, an equalisation vent.

The skirt defines an inner frustoconical surface and an outer surface. The inner frustoconical surface conforms in shape and size to the outer frustoconical surface of the mouth and the skirt thickens towards a lower edge thereof.

As such, the present configuration provides a conveniently usable reusable beverage container wherein the lid can be easily slipped on and off the mouth and, when engaged to the mouth resists pulling therefrom, tightly hugs the mouth and comprises sufficient smooth contact surface area to prevent leakage therebetween. Furthermore, the mouth, being devoid of sharp edges, snap on collars and the like may be manufactured by conventional glass forming manufacturing techniques.

An undersurface of the top section of the lid may comprise an annular recessed seat which further seals over and against sides of the rim of the mouth to inhibit leakage.

The skirt may be configured to form an ergonomically handheld uniform cylindrical profile with the cup devoid of edges and substantial gaps.

The formed mouth and conforming lid skirt may be applied to various reusable beverage container including one wherein the cup comprises a cylindrical waist narrowing to a cylindrical base which is covered by a conformingly cylindrical cover (such as of heat stable elastic silicon) which provides an ergonomically uniform exterior cylindrical profile wherein the lid adequately seals against the mouth, the transparent glass waist visibly exposes the liquid contents therein and the cylindrical cover provides thermal insulation when holding the container at the base.

Other aspects of the invention are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which:

FIG. 10 shows a lid for the first beverage container embodiment;

FIG. 11 shows a beverage container cup for the second beverage container embodiment;

FIG. 12 illustrates a base cover for the second beverage container embodiment;

DESCRIPTION OF EMBODIMENTS

A beverage container 100 comprises a glass cup 102 enclosed by a lid 101.

Figure 1:
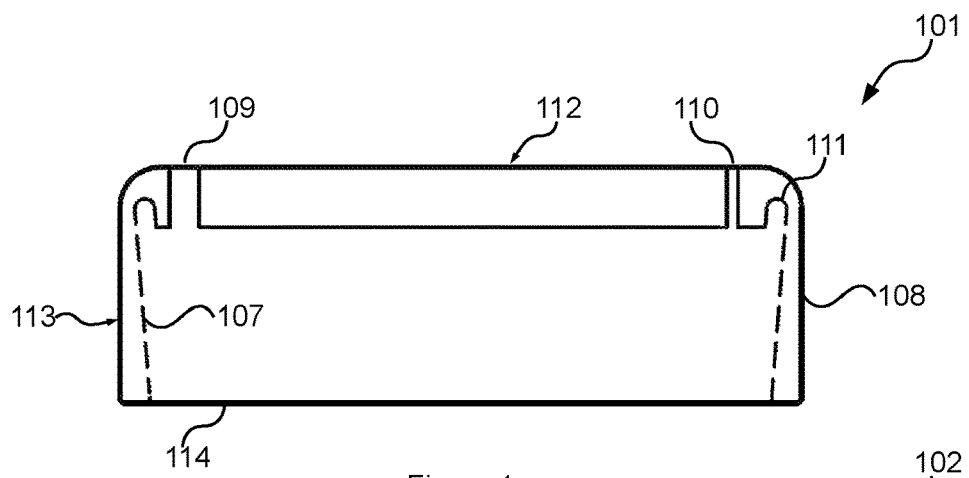
FIG. 1 shows a lid of a reusable beverage container in accordance with an embodiment.
Figure 2:
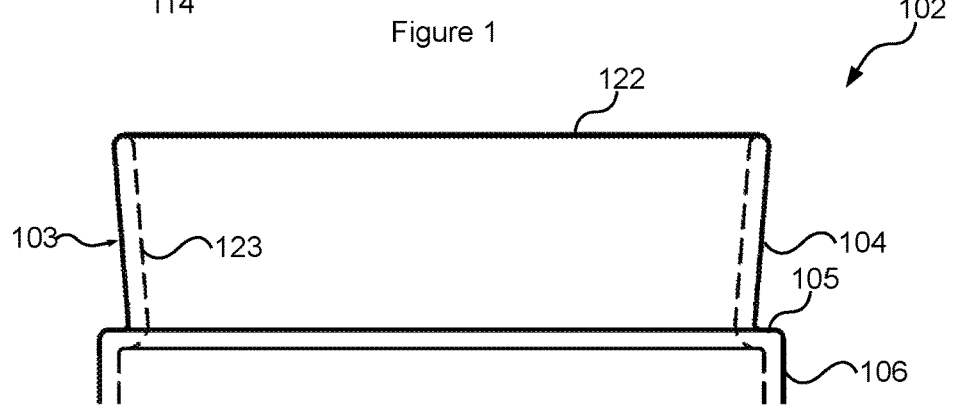
FIG. 2 illustrates a mouth of the beverage container in accordance with an embodiment.

With reference to FIG. 2, the cup 102 has a formed mouth 103 having a smooth exterior frustoconical surface 104. The mouth 103 has a height of greater than 15 mm which, in the embodiment shown in FIG. 6, comprises a height of approximately 20 mm and, in the embodiment shown in FIG. 11 is a height of approximately 30 mm.

The exterior frustoconical surface 104 widens in exterior diameter towards a rim 122 of the mouth 103. Properly, the mouth 103 is of uniform thickness such that an inner surface 123 thereof is also frustoconical.

The lid 101 comprises a top section 112 and a skirt 113. The entire lid 101, or at least the skirt 113 thereof is elastomeric (rubber-like) so that the skirt 113 and can be stretched over the formed mouth 103 and to snugly compress against the formed mouth 103 in a liquid-tight manner. The lid 101 preferably comprises heat stable elastic silicon.

The top section 112 comprises a drinking aperture 109 therethrough and, in embodiments, an equalisation vent 110.

The skirt 193 defines an inner frustoconical surface 107 and an outer surface 108. The inner frustoconical surface 107 conforms in shape and size to the outer frustoconical surface 104 of the cup 102 such and the skirt 113 thickens towards a lower edge 114 thereof. Preferably, when the lid 101 is engaged the mouth 103 a manner shown in FIG. 3, the outer surface 108 of the lid 101 is cylindrical.

Figure 6:
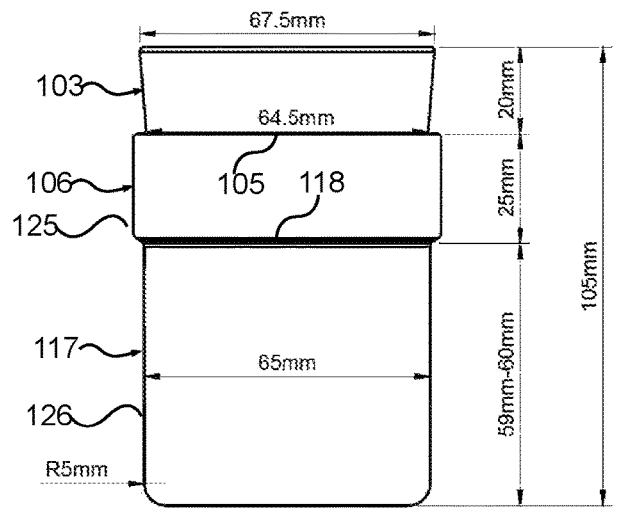
FIG. 6 illustrates a beverage container cup in accordance with a second beverage container embodiment.
Figure 8:
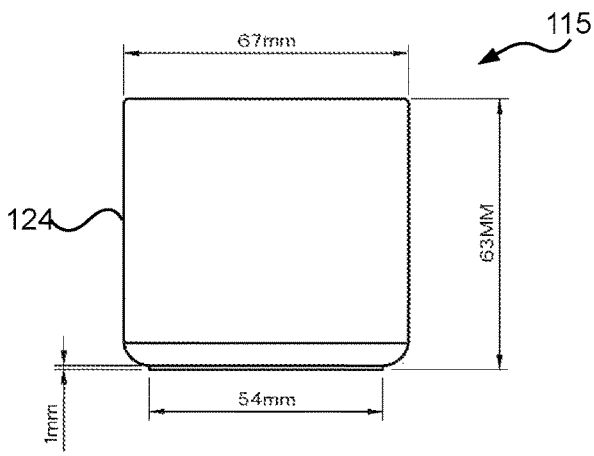
FIG. 8 illustrates a base cover the second beverage container embodiment.

In the embodiment shown in FIGS. 6 and 11, the cup 102 comprises a waist 106 which narrows at a shoulder 105 to the mouth 103. In a preferred embodiment, the skirt 113 has a height matching the height of the mouth 103 such that the lower edge 114 of the skirt 113 meets the upper edge of the shoulder 114 in the manner shown in FIG. 3 thereby eliminating or avoiding substantial gaps between the lower edge 114 of the skirt 113 and the shoulder 105. For example, the lid 101 shown in FIG. 10 has a height of approximately 23.5 mm to fit the 20 mm high frustoconical formed mouth 103 of the cup 102 of the first embodiment shown in FIG. 6 thereby eliminating or avoiding substantial gaps between the lower edge 114 of the skirt 113 and the shoulder 105. Similarly, for the cup 102 of the second embodiment of FIG. 11 wherein the formed mouth 103 has a height of approximately 29.5 mm, the height of the corresponding lid 101 may be configured to eliminate or avoid substantial gaps between the lower edge 114 of the skirt 113 and the shoulder 105. In embodiments however, the lid 101 for the first embodiment shown in FIG. 10 may yet interchangeably fit over the formed mouth 103 of the cup 102 of the second embodiment shown in FIG. 11, thereby yet forming a watertight seal despite there being a gap between the lower edge 114 of the skirt 113 and the shoulder 105.

Figure 3:
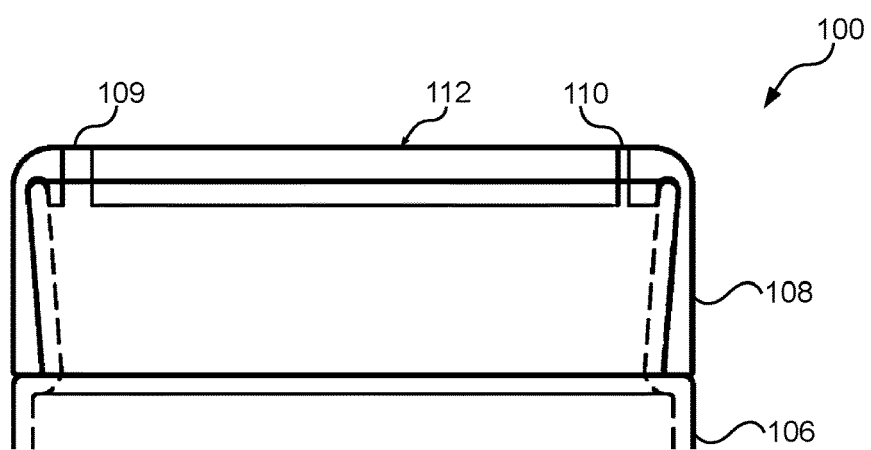
FIG. 3 illustrates the lid sealing against the mouth.

Further preferably, the skirt 113 is sized and the lower edge 114 of the skirt 113 comprises a thickness matching the narrowing in diameter from the waist 106 to the base of the mouth 103 such that, when the lid 101 is engaged to the cup 102 in the manner shown in FIG. 3, the diameter of the outer surface 108 of the lid 101 matches the outer diameter of the exterior surface 125 of the waist 106. With reference to FIGS. 10 and 11, when the lid 101 is not engaged to the cup 102, the lid 101 may comprise a slightly smaller exterior diameter as compared to that of the waist 106 (such as being smaller than by approximately 2 mm wherein the lid 101 comprises an exterior diameter of approximately 68 mm whereas the waist 116 comprises an exterior diameter of approximately 70 mm) such that, when the lid 101 is placed over the mouth 103, the lid 101 stretches slightly to the diameter of the waist 116.

The top section 112 may comprise an annular peripheral recessed seat 111 therein which engages over the top and sides of the rim 122 of the mouth 103. As such, as shown in FIG. 3, the top section 112 extends slightly into the opening of the mouth 113 and the seat 111 seals against the rim 122 of the mouth 103. As is also shown in FIG. 3, the drinking aperture 109 and equalisation vent 110 locate in from the annular peripheral recessed seat 111.

The frustoconical mouth 103 of the cup 102 and conforming skirt 111 of the lid 101 may be applied to various beverage container configurations 100.

Figure 4:
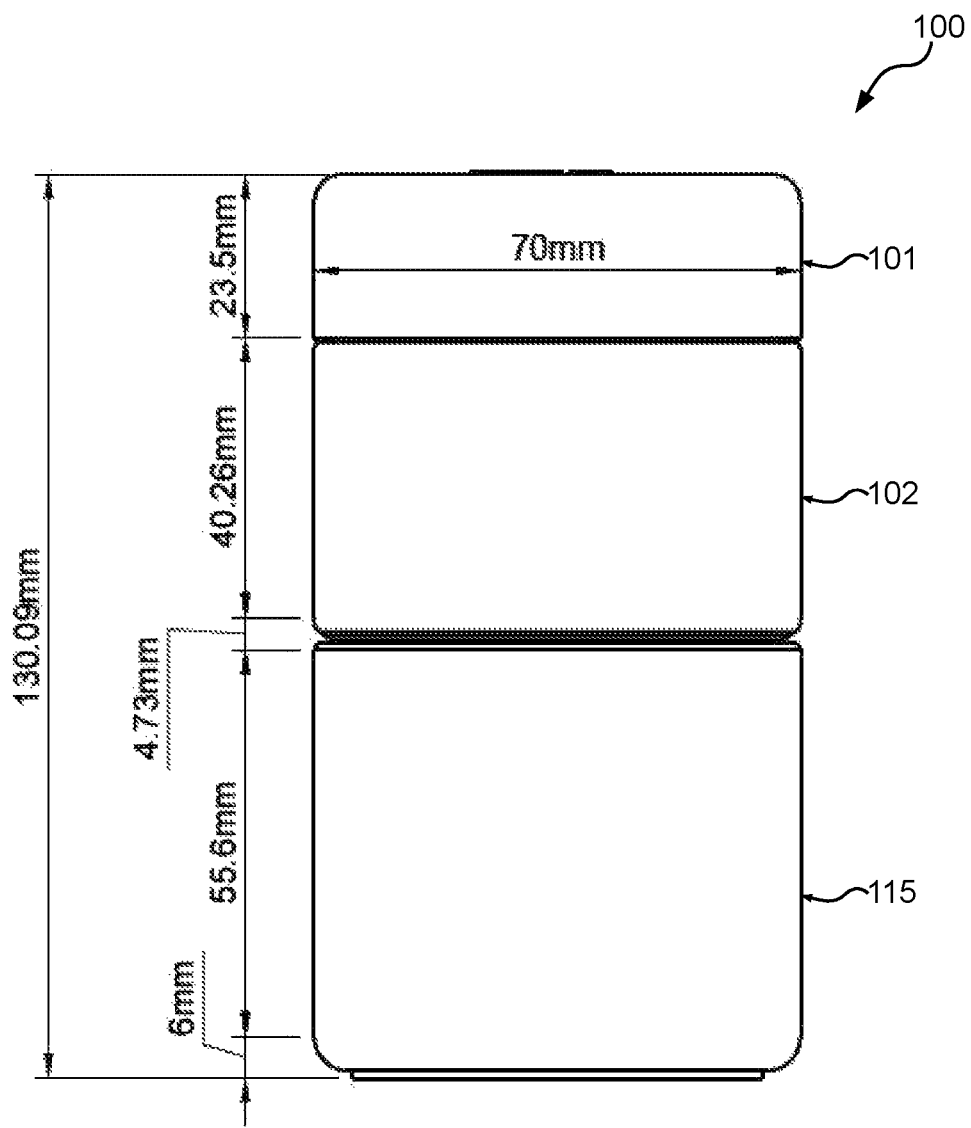
FIG. 4 illustrates a beverage container in accordance with a first beverage container embodiment.
Figure 9:
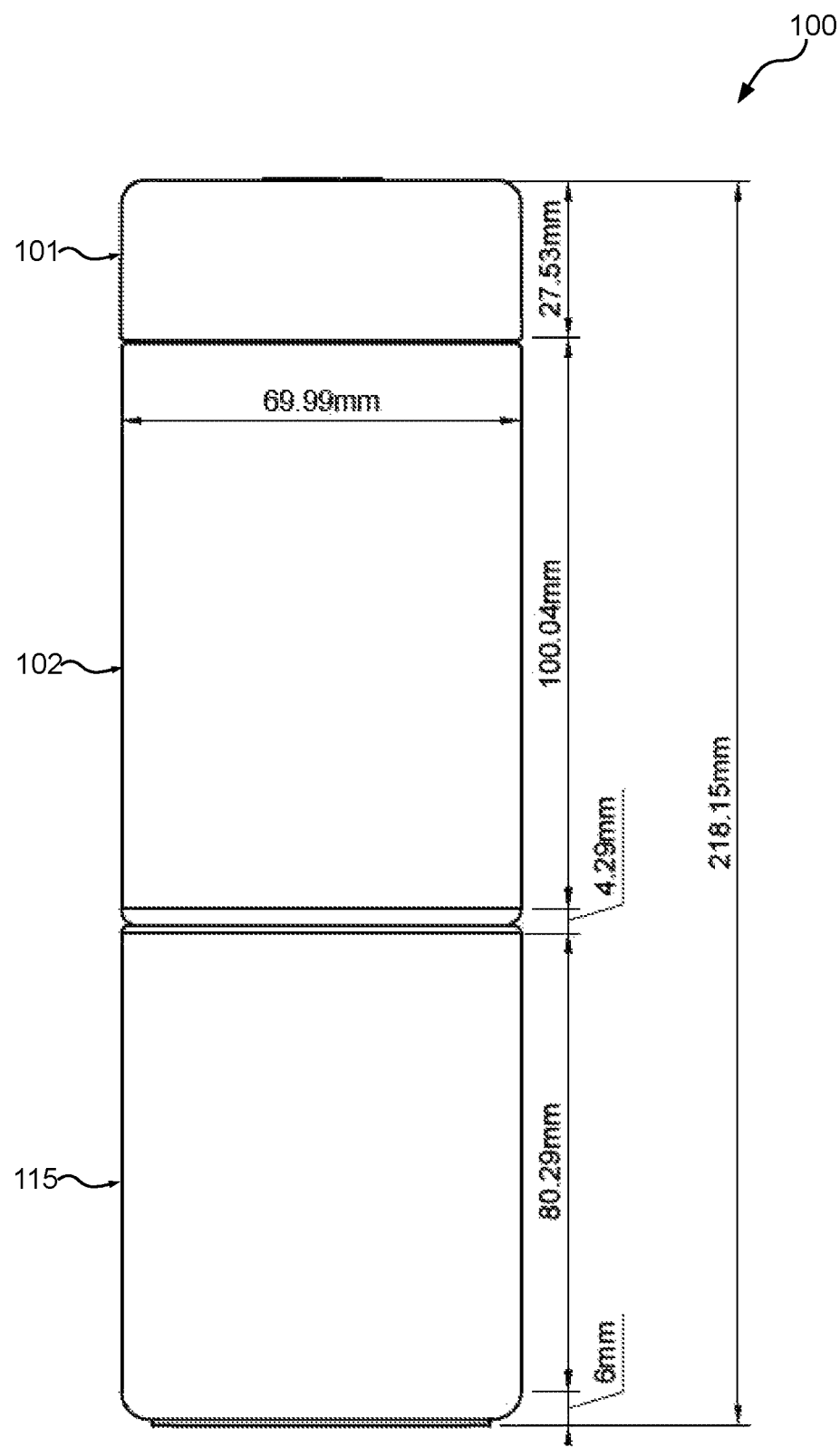
FIG. 9 illustrates a beverage container in accordance with a second beverage container embodiment.

FIG. 4 shows a medium-sized variant and FIG. 9 shows a large-sized variant wherein the waist 106 of the cup 102 narrows at an overhang 118 to a base section 117.

A cover 115 may insulate the base section 117. The cover 115 may similarly comprise heat stable elastic silicon.

An exterior surface 125 of the waist 106 and an exterior surface 126 of the base section 117 may both be cylindrical as shown. In this regard, the base cover 115 may comprise an interior surface 127 which is cylindrical.

Preferably, the base cover 115 has a size and thickness such that an exterior diameter of the exterior surface 124 of the base cover 115 matches an exterior diameter of the exterior surface 125 of the waist 106 when engaged in the waist 106. Further preferably, the base cover 115 has a height such that an upper edge thereof meets the overhang 118, thereby reducing or eliminating a gap between the waist 106 and the base cover 115.

Figure 7:
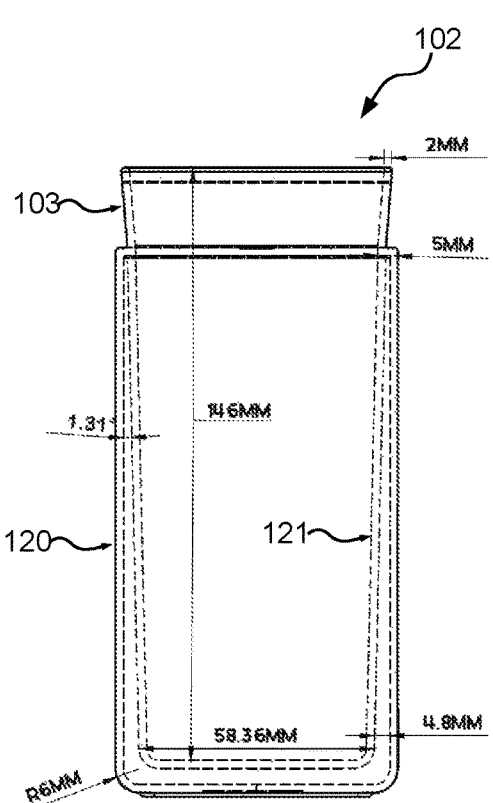
FIG. 7 illustrates a beverage container cup in accordance with third beverage container cup embodiment.

FIG. 7 shows an insulated variant of the beverage cup 102 which comprises an outer cup portion 120 and a spaced-apart inner cup portion 121 providing insulation therebetween. The outer cup portion 120 may be cylindrical and the inner cup portion 121 may be frustoconical meeting the outer cup portion 120 at the shoulder 105.

Figure 5:
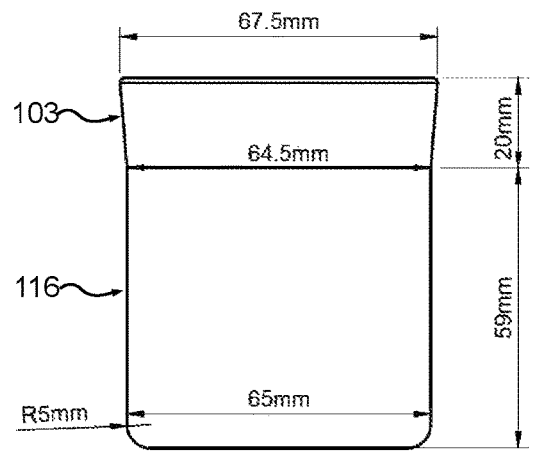
FIG. 5 illustrates a beverage container cup in accordance with a first beverage container cup embodiment.

FIG. 5 shows a variant of the beverage cup 102 wherein the waist 106 extends to the base of the cup 102 and which widens upwardly to the frustoconical mouth 103.

In embodiments, the beverage container 100 is configured such that the cover 115 is configured to fit the beverage cup 102 variants shown in FIGS. 5 and 7.

Figure 13:
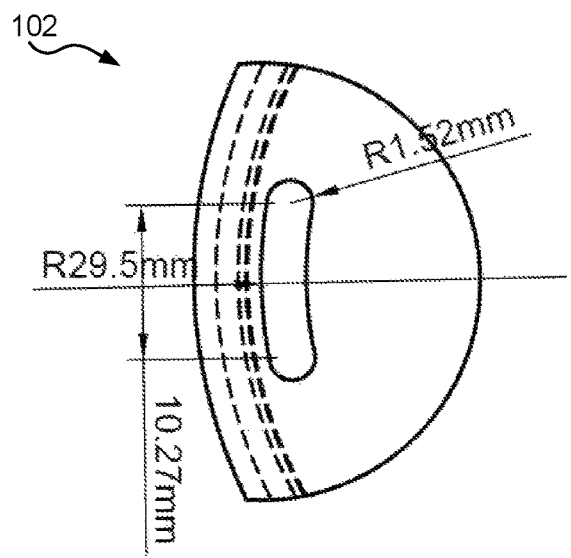
FIGS. 13 and 14 show a lid in accordance with a first lid embodiment.
Figure 14:
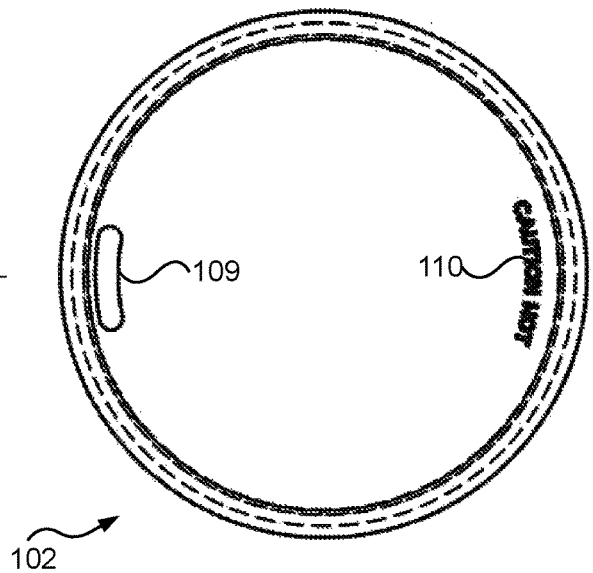
Figure 15:
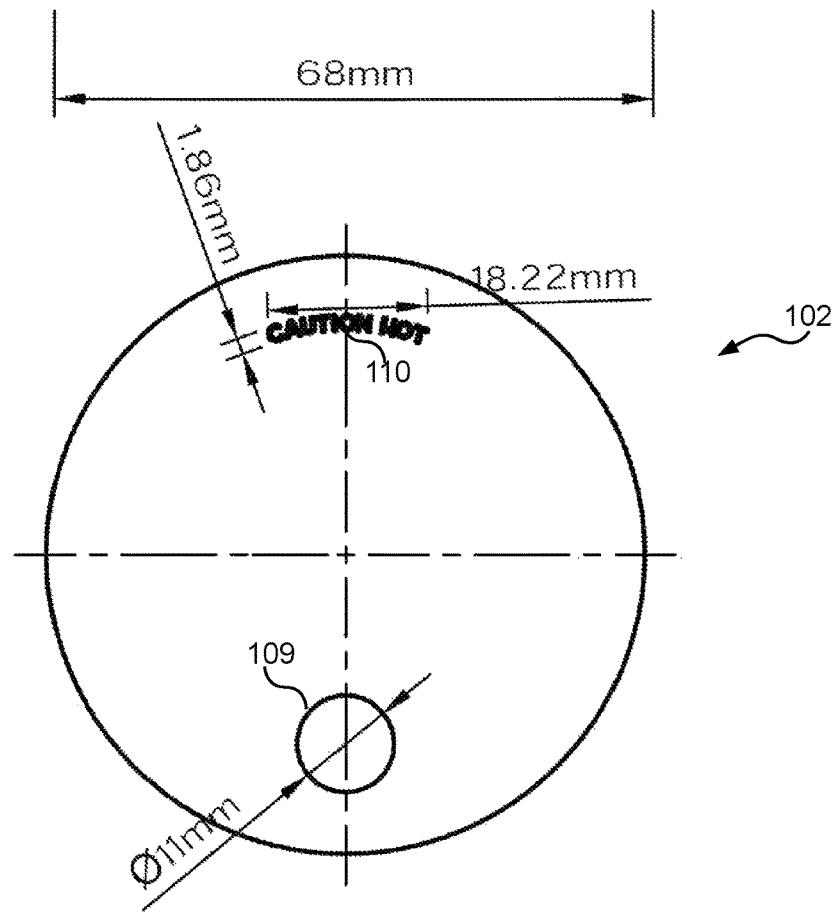
FIG. 15 shows a lid in accordance with a second lid embodiment.

FIGS. 13 and 14 show an embodiment wherein the drinking aperture 109 is semi-annular, comprises a length of approximately 30 mm and a width of approximately 3 mm. FIG. 15 shows an embodiment wherein the drinking aperture 109 is circular comprising a diameter of approximately 11 mm.

In the embodiment shown in FIGS. 14 and 15, the equalisation vent 110 is located opposite the drinking aperture 109 and may be concealed within embossed writing formed on a surface of the top section of the lid 101.

The foregoing description, for purposes of explanation, used specific nomenclature to provide a thorough understanding of the invention. However, it will be apparent to one skilled in the art that specific details are not required in order to practise the invention. Thus, the foregoing descriptions of specific embodiments of the invention are presented for purposes of illustration and description. They are not intended to be exhaustive or to limit the invention to the precise forms disclosed as obviously many modifications and variations are possible in view of the above teachings. The embodiments were chosen and described in order to best explain the principles of the invention and its practical applications, thereby enabling others skilled in the art to best utilize the invention and various embodiments with various modifications as are suited to the particular use contemplated. It is intended that the following claims and their equivalents define the scope of the invention.

The term "approximately" or similar as used herein should be construed as being within 10% of the value stated unless otherwise indicated.

The invention claimed is:

1. A reusable beverage container comprising:
   a glass cup having a formed mouth having a smooth exterior frustoconical surface which continuously widens in exterior diameter from a base of the mouth to a rim of the mouth, the mouth having a height of greater than 15 mm; and
   a lid for engaging the mouth, the lid comprising a top section and an elastomeric skirt, the top section having a drinking aperture therethrough, the skirt defining an inner frustoconical surface and an outer surface, the inner frustoconical surface conforming in shape and size to the outer frustoconical surface and the skirt thickening towards a lower edge thereof, wherein:
   the lower edge is positioned at the base of the mouth when the lid is fully seated on the mouth; and
   the skirt extends lower than a bottommost part of the top section of the lid.

2. The reusable beverage container as claimed in claim 1, wherein, when the lid is engaged to the mouth, the outer surface of the lid is cylindrical and fluid within an interior of the cup is flowable through the aperture.

3. The reusable beverage container as claimed in claim 1, wherein the cup narrows to the mouth at a shoulder.

4. The reusable beverage container as claimed in claim 3, wherein the skirt has a height matching the height of the mouth such that a lower edge of the skirt meets the shoulder.

5. The reusable beverage container as claimed in claim 4, wherein the skirt is configured such that, when the skirt engages the mouth, an exterior diameter of the skirt matches an adjacent exterior diameter of the cup.

6. The reusable beverage container as claimed in claim 5, wherein, when the skirt is not engaged to the mouth, the exterior diameter of the skirt is slightly smaller than the exterior diameter of the cup.

7. The reusable beverage container as claimed in claim 6, wherein, when the skirt is not engaged to the mouth, the exterior diameter of the skirt is approximately 2 mm less in diameter compared to the exterior diameter of the cup.

8. The reusable beverage container as claimed in claim 1, wherein the mouth has a height of greater than 19 mm.

9. The reusable beverage container as claimed in claim 8, wherein the mouth has a height of approximately 20 mm.

10. The reusable beverage container as claimed in claim 1, wherein the mouth has a height of greater than 25 mm.

11. The reusable beverage container as claimed in claim 10, wherein the mouth has a height of approximately 30 mm.

12. The reusable beverage container as claimed in claim 1, wherein the lid is entirely made of elastomeric material.

13. The reusable beverage container as claimed in claim 1, wherein the elastomeric skirt comprises heat stable elastic silicon.

14. The reusable beverage container as claimed in claim 1, wherein an undersurface of the top section has a peripheral annular seat therein which seals over a top edge and sides of the rim of the mouth.

15. The reusable beverage container as claimed in claim 14, wherein the drinking aperture is located in from the peripheral annular seat.

16. The reusable beverage container as claimed in claim 15, wherein the top section further comprises an equalisation vent.

17. The reusable beverage container as claimed in claim 15, wherein the equalisation vent is located diametrically opposite the drinking aperture.

18. The reusable beverage container as claimed in claim 15, wherein the drinking aperture is semi-annular.

19. The reusable beverage container as claimed in claim 15, wherein the drinking aperture is circular and comprises a diameter of greater than 5 mm.

20. The reusable beverage container as claimed in claim 17, wherein an upper surface of the top section comprises writing embossed thereon and wherein the equalisation vent is concealed within an embossed character of the writing.

21. The reusable beverage container as claimed in claim 1, wherein the cup comprises a cylindrical waist narrowing to the mouth at an upper shoulder and narrowing to a cylindrical base section at a lower overhang, and wherein the container further comprises a cylindrical insulative cover which fits over the cylindrical base.

22. The reusable beverage container as claimed in claim 21, wherein the cylindrical cover comprises a size and thickness such that an exterior diameter of the cylindrical cover matches an exterior diameter of the waist.

23. The reusable beverage container as claimed in claim 21, wherein the cylindrical cover comprises a height such that an upper edge thereof meets the lower overhang.

24. The reusable beverage container as claimed in claim 21, wherein the waist comprises a height of greater than 20 mm.

25. The reusable beverage container as claimed in claim 21, wherein the waist comprises a height of greater than 90 mm.

\* \* \* \* \*